Oct. 9, 1962
A. M. WILSON
3,058,113
NOISE ELIMINATION CIRCUIT FOR PULSE DURATION MODULATION RECORDING
Filed March 30, 1959
2 Sheets-Sheet 1
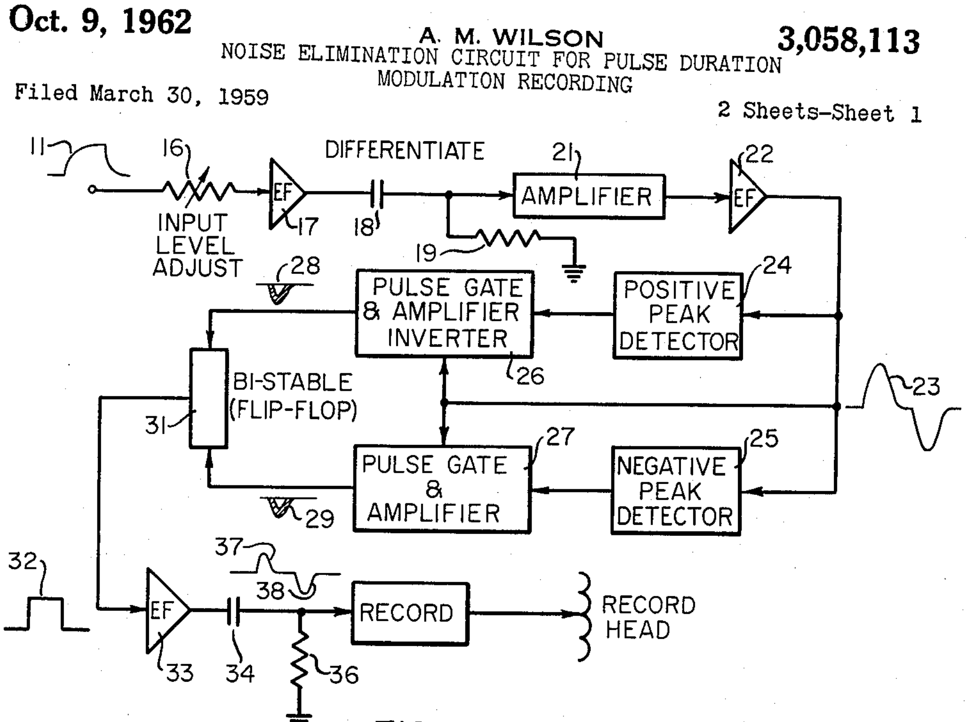
FIG. 1
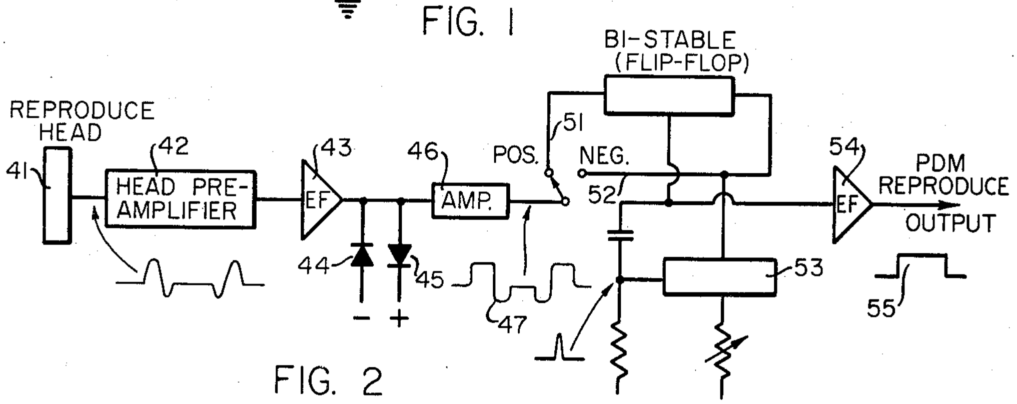
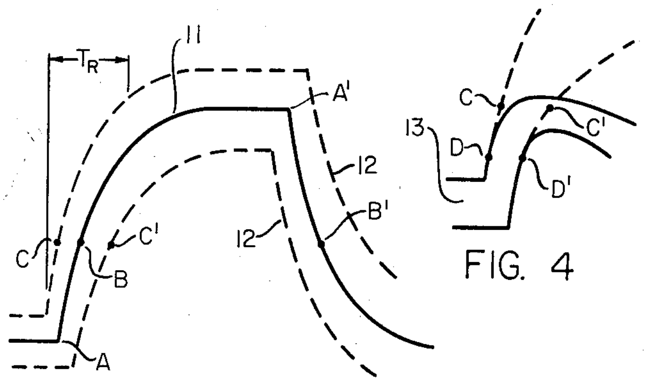
FIG. 3, FIG. 4
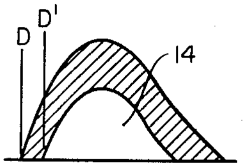
FIG. 5
AL M. WILSON
*INVENTOR.*
BY
Flehr and Swain
ATTORNEYS Oct. 9, 1962 A. M. WILSON 3,058,113

NOISE ELIMINATION CIRCUIT FOR PULSE DURATION MODULATION RECORDING

Filed March 30, 1959 2 Sheets-Sheet 2

AL M. WILSON
*INVENTOR.*

BY Flehr and Swain
ATTORNEYS

United States Patent Office 3,058,113
Patented Oct. 9, 1962

3,058,113
NOISE ELIMINATION CIRCUIT FOR PULSE DURATION MODULATION RECORDING

Al M. Wilson, Palo Alto, Calif., assignor to Ampex Corporation, Redwood City, Calif., a corporation of California Filed Mar. 30, 1959, Ser. No. 802,966
4 Claims. (Cl. 346—74)

This invention relates to a pulse duration modulation (PDM) recording and reproducing system and method.

In the recording of PDM signals, the length is defined by a very short duration pulse of one polarity for the beginning of the pulse being recorded, and a very short duration pulse of opposite polarity for the end of the pulse being recorded. One method of generating accurately spaced pulses which define the PDM pulse length is the center slice method. In this method, a voltage which fixes a reference level is derived and a slice is taken from the PDM pulse at this level. The reference voltage may be derived by generating a voltage equal to one-half the peak to peak of the incoming pulse. Another method of determining a pulse length includes positioning the pulses symmetrically about ground and taking the center slice from the signal pulse with ground as the reference.

With these methods there is difficulty in maintaining a reference voltage or accurately positioning the pulses, respectively, because of duty cycle changes in the PDM signal. In either case the effect is to lengthen or shorten the true pulse length depending upon whether the incoming signal is a series of positive going or of negative going pulses.

It is an object of the present invention to provide an improved pulse duration modulation signal recording and reproducing system and method.

It is another object of the present invention to provide a PDM signal recording and reproducing system and method in which the pulse length is defined by differentiating the pulses to be recorded.

It is still another object of the present invention to provide a PDM signal recording system and method in which the duty cycle and repetition rate of the incoming pulses has minimum effect upon the determination of pulse length.

According to the present invention the effects of a noise level content in pulses to be recorded as PDM signals are eliminated by selective differentiation and gating. The gating is accomplished in response to pulses corresponding to peak values of the differentiated pulses above the noise level. The gated pulses then drive a bistable circuit to form a square wave having a duration substantially equal to the input pulse with the noise removed.

These and other objects of the invention will become more clearly apparent from the following description when taken in conjunction with the accompanying drawing.

Referring to the drawing:

FIGURE 1 is a block diagram schematically illustrating a PDM signal recording system incorporating the present invention;

FIGURE 2 is a schematic block diagram illustrating a typical pulse duration modulation signal reproducing system;

Figure 6:
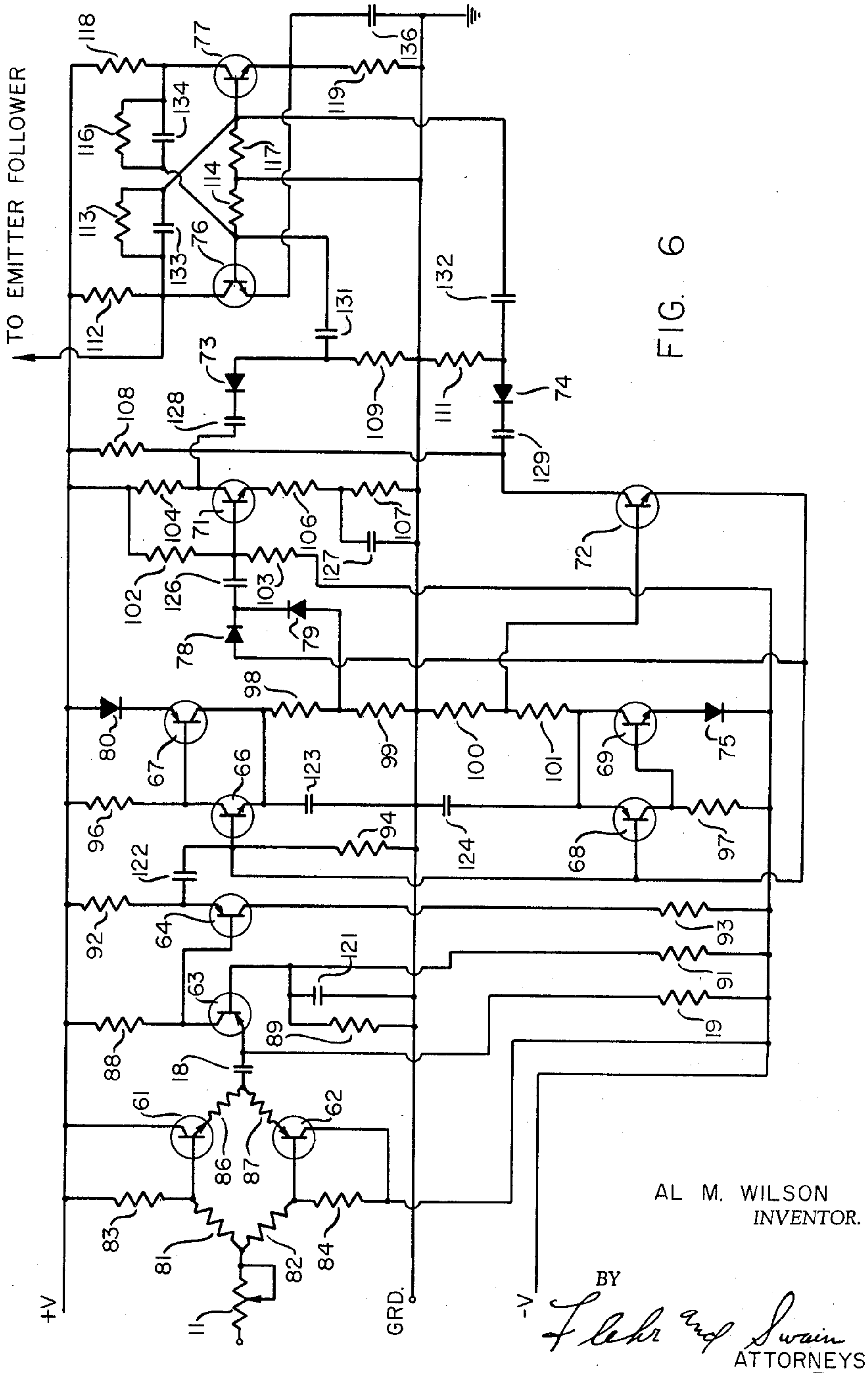

FIGURE 3 schematically illustrates a PDM pulse with noise superimposed thereon, the noise having an amplitude approximately one-third the amplitude of the signal;

FIGURE 4 shows the pulse of FIGURE 3 after it has been differentiated;

FIGURE 5 shows the portion of the differentiated pulse used to trigger the associated bistable circuit; and FIGURE 6 shows a detailed circuit diagram of a PDM recording network in accordance with the present invention.

The curve 11 in FIGURE 3 shows the shape of a typical PDM pulse having a rise time $T_R$. In the absence of noise, any two symmetrically located points will define the pulse length, for example, points A—A′ and B—B′. Points A—A′ may be determined by differentiation, as will be presently described, and points B—B′ by taking a center slice.

When there is noise mixed with the signal, as shown by the noise envelope delineated by lines 12 in the figure, the determination of the pulse length is much less accurate especially if taken at the points B—B′. It is noted that as one goes above the point B, the resolution becomes poor, and as one goes below the point B, the resolution improves. Similarly, as one goes below the point B′, the resolution decreases, while if one goes above the point B′, the resolution increases.

If the rise time of the noise frequency components is no faster than the signal, then a differential of the waveshape if properly taken, can define the edge of the PDM pulse with less ambiguity than the spread of the points C—C′, FIGURES 3 and 4.

When a signal having a time constant T is differentiated by a circuit having an equivalent or shorter time constant, the peak value of the differentiated pulse will be less than the peak value of the original signal. For example, if the time constant of the differentiating circuit is equal to the time constant of the signal, the differentiated pulse will have a peak amplitude equal to approximately .35 the peak amplitude of the original pulse. A differential pulse which results from differentiating the PDM pulse of FIGURE 3 is illustrated in FIGURE 4 by the solid lines.

It should be observed that the time constant of the differentiating circuit should not be such that the noise envelope 13 is increased in amplitude. If the area in the vicinity of the points D—D′ can be selected, a triggering edge having less ambiguity than at the points C—C′ can be obtained. This can be achieved by operating upon the differentiated pulse to gate only the portion above the noise envelope 13. A pulse of the type shown in FIGURE 5 will result if the differential pulse is properly gated. The resolution which can be obtained is then comparable to the ambiguity delineated by D—D′.

The time constant should be chosen such that a usable open area 14 exists in the differential gated pulse. If the area 14 closes, then the resolution is lost. The time constant should not be so long that the noise 13 in the differentiated signal overrides the pulse. Generally, these conditions are met if the differentiating circuit is sufficiently fast so that the peak of the differentiated pulse is less than one-half the peak of the signal and yet slow enough not to increase the amplitude of the noise.

A block diagram of a circuit for deriving accurately spaced marker pulses is shown in FIGURE 1. The input pulse 11 is applied through a level adjuster 16 to an emitter-follower 17. The output of the emitter-follower is differentiated by the passive circuit including the capacitor 18 and resistor 19. The differentiated pulse is amplified by amplifier 21 and applied to an emitter-follower 22. The waveform of the differentiated-amplified PDM pulse is schematically shown at 23. The output of the emitter-follower 22 is applied to a positive peak detector 24 and a negative peak detector 25 which develop plus and minus reference voltages for controlling the gating circuits 26 and 27, respectively so that the waveforms are chopped off and only the portion above the noise is passed. The pulse gate 26 includes an amplifier inverter which serves to amplify and invert the waveform to produce an output waveform of the type shown at 28.

The pulse gate 27 includes an amplifier to amplify the signal to provide a waveform of the type shown at 29. The leading edges of the pulses 28 and 29 are spaced an amount corresponding to the duration of the PDM pulse. The waves 28 and 29 are applied to a bistable circuit 31 which is triggered by the leading edges to form a square wave 32 which, in essence, is a reconstructed PDM pulse. The pulse 32 is applied to an emitter-follower 33, a differentiating circuit including the capacitors 34 and resistor 36, and then to the recording head. The head records a pair of spaced pulses 37 and 38 of opposite polarity. The recorded pulses define the PDM pulse length.

The circuit can be simplified if the differentiated pulse height can be adjusted and the negative and positive heights are the same. A fixed reference voltage can be employed in the gating circuits.

A suitable reproduce circuit is illustrated in FIGURE 2 and includes a reproduce head 41 which feeds a preamplifier 42. The output of the preamplifier 42 is applied to an emitter-follower 43 and to negative and positive clipping diodes 44 and 45, respectively. The clipped signal is then amplified by an amplifier 46 and has a waveshape of the type shown at 47. The output of the amplifier 46 is applied to either the positive or negative line 51 or 52, depending upon the polarity of the recorded pulses. The bistable multivibrator can be used for either polarity.

The multivibrator is triggered on and off at the zero crossover points of the clipped wave 47. A tape dropout on the trailing edge pulse may result in loss of information from a pulse. Loss of pulses is avoided by using a monostable multivibrator 53 to insure resetting of the bistable multivibrator. The monostable circuit is triggered by the bistable circuit and is adjusted to have a period greater than the longest pulse duration being recorded. The reconstructed pulse 55 is available at the emitter-follower 54.

A detailed circuit diagram of a PDM record circuit is shown in FIGURE 6. The input level adjustment is shown at 11. The transistors 61 and 62 form the emitter-follower 17. The capacitor 18 and resistor 19 form the differentiating circuit. The transistor 63 and associated circuitry forms the amplifier 21 while the transistor 64 and associated circuitry forms the emitter-follower 22. The transistors 66 and 67 and associated circuitry form the positive peak detector 24, while the transistors 68 and 69 and associated circuitry form the negative peak detector 25. The transistors 71 and 72 form the amplifiers 26 and 27, respectively, with the diodes 73 and 74 gating the pulses to the bistable circuit which includes the transistors 76 and 77 and associated circuitry.

Recording apparatus was constructed in accordance with the circuit shown in FIGURE 6. The circuit components had the following values:

*Voltages*

| | Volts |
|---|---|
| +V | 12 |
| —V | —12 |

*Transistors*

| | | | |
|---|---|---|---|
| **61** | 2N585. | **68** | 2N324. |
| **62** | 2N321. | **69** | 2N585. |
| **63** | 2N169A. | **71** | 2N169A. |
| **64** | 2N321. | **72** | 2N169A. |
| **66** | 2N169A. | **76** | 2N169A. |
| **67** | 2N324. | **77** | 2N169A. |

*Diodes*

| | | | |
|---|---|---|---|
| **73** | 1N90. | **78** | 1N90. |
| **74** | 1N90. | **79** | 1N90. |
| **75** | 1N90. | **80** | 1N90. |

*Resistors*

| | Ohm | | Ohm |
|---|---|---|---|
| **11** | 250 | **100** | 22K |
| **19** | 2200 | **101** | 15K |
| **81** | 1500 | **102** | 15K |
| **82** | 1500 | **103** | 22K |
| **83** | 22K | **104** | 4.7K |
| **84** | 22K | **106** | 330 |
| **86** | 220 | **107** | 2.2K |
| **87** | 220 | **108** | 4.7K |
| **88** | 10K | **109** | 47K |
| **89** | 22K | **111** | 47K |
| **91** | 6.8K | **112** | 2.2K |
| **92** | 2.2K | **113** | 47K |
| **93** | 470 | **114** | 15K |
| **94** | 10K | **116** | 47K |
| **96** | 10K | **117** | 15K |
| **97** | 10K | **118** | 2.2K |
| **98** | 15K | **119** | 680 |
| **99** | 22K | | |

*Capacitors*

| | | | |
|---|---|---|---|
| **18** | 0.001 mf. | **128** | .01 mf. |
| **121** | 0.01 mf. | **129** | .01 mf. |
| **122** | 0.1 mf. | **131** | 500 mmf. |
| **123** | 10 mf. | **132** | 500 mmf. |
| **124** | 10 mf. | **133** | 100 mmf. |
| **126** | .05 mf. | **134** | 600 mmf. |
| **127** | .5 mf. | **136** | .001 mf. |

A circuit in accordance with the foregoing was constructed and operated. The accuracy of recorded pulse width was within ±.3 microsecond; with one volt peak to peak signal input of either polarity; the pulse width was 10 microseconds to 6000 microseconds. The pulse rate was 100 pulses per second to 10,000 pulses per second; and the rise time was 1 microsecond to 20 microseconds.

With added noise of amplitude equal to one-third of the peak to peak amplitude of the signal, the accuracy and resolution of the recorded pulse width was as follows: With rise time of 1 microsecond, within ±1 microsecond; with rise time of 12 microseconds, the recorded pulse width was within ±1.1 microseconds; and with a rise time of 25 microseconds, within ±1.3 microseconds.

I claim:

1. A recording system of the pulse duration modulation type for input pulses having a noise component comprising means for differentiating input pulses and having a time constant substantially equal to the time constant of the input pulses, first and second means for forming separate pulses respectively corresponding to peak portions of positive and negative swings of the differentiated pulses, first and second gating means for passing portions of the differentiated pulses in response to the respective separate pulses, means for forming a square wave in response to the respective leading edges of the passed portions of the differentiated pulses whereby the duration of the square wave corresponds to the duration of the input pulse with the effects of noise eliminated, means for differentiating the square wave, and means for magnetically recording the differentiated square wave.

2. The combination of claim 1 wherein each of the means for forming separate pulses respectively corresponding to peak portions of positive and negative swings of the differentiated pulses is a peak detector biased to eliminate the portion of the signal exceeding the level of the noise component.

3. The combination of claim 2 wherein each of the gating means is a coincidence circuit having a first input receiving pulses from a corresponding peak detector, a second input receiving the differentiated pulses, and an output delivering only the peak portions of the differentiated pulses.

4. The combination of claim 3 wherein the means for forming a square wave in response to the respective leading edges of the passed portions of the differentiated pulses is a flip-flop circuit having a first input receiving pulses corresponding to the positive pulses from the first gating means for forming the leading edge of a square wave at an output and a second input receiving negative pulses from the second gating means for forming the trailing edge of the square wave with the time between leading and trailing edges accurately corresponding to the actual duration of the input pulses without the noise component.

References Cited in the file of this patent

UNITED STATES PATENTS

| | | |
|---|---|---|
| 2,418,127 | Labin | Apr. 1, 1947 |
| 2,636,133 | Hussey | Apr. 21, 1953 |
| 2,660,672 | Urtel | Nov. 24, 1953 |
| 2,794,123 | Younker | May 28, 1957 |
| 2,830,191 | McCollom | Apr. 8, 1958 |
| 2,853,634 | Diese | Sept. 23, 1958 |
| 2,863,054 | Dobbins | Dec. 2, 1958 |